United States Patent
Kibat et al.

(10) Patent No.: US 8,047,564 B2
(45) Date of Patent: Nov. 1, 2011

(54) AIRBAG

(75) Inventors: Jonathan Richard Kibat, Warren, MI (US); Patrick James O'Leary, Clinton Township, MI (US); Richard Andrew Wiik, Fort Gratiot, MI (US)

(73) Assignee: TK Holdings Inc., Auburn Hills, MI (US)

( * ) Notice: Subject to any disclaimer, the term of this patent is extended or adjusted under 35 U.S.C. 154(b) by 20 days.

(21) Appl. No.: 12/585,068

(22) Filed: Sep. 2, 2009

(65) Prior Publication Data

US 2011/0049852 A1 Mar. 3, 2011

(51) Int. Cl.
*B60R 21/207* (2006.01)
*B60R 21/2338* (2011.01)

(52) U.S. Cl. .................. 280/730.2; 280/743.2

(58) Field of Classification Search .......... 280/729, 280/730.2, 743.1, 743.2
See application file for complete search history.

(56) References Cited

U.S. PATENT DOCUMENTS

| | | | | |
|---|---|---|---|---|
| 5,172,790 A * | 12/1992 | Ishikawa et al. | ............. | 180/268 |
| 5,306,043 A * | 4/1994 | Mihm et al. | ............. | 280/732 |
| 5,310,214 A * | 5/1994 | Cuevas | ............. | 280/729 |
| 5,362,101 A * | 11/1994 | Sugiura et al. | ............. | 280/743.2 |
| 5,380,038 A * | 1/1995 | Hawthorn et al. | ............. | 280/730.1 |
| 5,499,840 A * | 3/1996 | Nakano | ............. | 280/730.1 |
| 5,676,395 A * | 10/1997 | Oe et al. | ............. | 280/730.2 |
| 5,730,464 A * | 3/1998 | Hill | ............. | 280/743.2 |
| 6,302,433 B1 * | 10/2001 | Ellerbrok et al. | ............. | 280/729 |
| 6,364,348 B1 * | 4/2002 | Jang et al. | ............. | 280/730.2 |
| 6,431,599 B1 * | 8/2002 | Bohn | ............. | 280/743.1 |
| 6,502,858 B2 * | 1/2003 | Amamori | ............. | 280/743.2 |
| 6,536,800 B2 * | 3/2003 | Kumagai et al. | ............. | 280/743.1 |
| 6,880,666 B2 * | 4/2005 | Kikuchi et al. | ............. | 180/274 |
| 7,600,777 B2 * | 10/2009 | Suzuki et al. | ............. | 280/730.2 |
| 7,717,459 B2 * | 5/2010 | Bostrom et al. | ............. | 280/730.1 |
| 7,735,856 B2 * | 6/2010 | Schlosser et al. | ............. | 280/730.2 |
| 7,793,977 B2 * | 9/2010 | Sato et al. | ............. | 280/743.2 |
| 7,810,839 B2 * | 10/2010 | Denys et al. | ............. | 280/739 |
| 7,942,444 B2 * | 5/2011 | Steinbach et al. | ............. | 280/743.2 |
| 2002/0096871 A1 * | 7/2002 | Pinsenschaum et al. | .. | 280/743.2 |
| 2003/0030255 A1 * | 2/2003 | Igawa et al. | ............. | 280/730.1 |
| 2005/0206138 A1 * | 9/2005 | Breuninger et al. | ............. | 280/729 |
| 2006/0043707 A1 * | 3/2006 | Hasebe et al. | ............. | 280/730.2 |
| 2006/0232054 A1 * | 10/2006 | Schlosser et al. | ............. | 280/743.2 |
| 2007/0024033 A1 * | 2/2007 | Suzuki et al. | ............. | 280/730.2 |
| 2007/0096444 A1 * | 5/2007 | Bostrom et al. | ............. | 280/730.2 |
| 2007/0267856 A1 * | 11/2007 | Schedler | ............. | 280/743.2 |
| 2007/0278771 A1 * | 12/2007 | Sato et al. | ............. | 280/730.2 |
| 2009/0001696 A1 * | 1/2009 | Garcia et al. | ............. | 280/730.2 |
| 2009/0058052 A1 * | 3/2009 | Ford et al. | ............. | 280/730.1 |
| 2009/0079171 A1 * | 3/2009 | Dix et al. | ............. | 280/730.2 |
| 2009/0079173 A1 * | 3/2009 | Jang et al. | ............. | 280/730.2 |
| 2009/0091106 A1 * | 4/2009 | Denys et al. | ............. | 280/730.2 |
| 2009/0184499 A1 * | 7/2009 | Slaats et al. | ............. | 280/730.2 |
| 2009/0243267 A1 * | 10/2009 | Fletcher et al. | ............. | 280/730.2 |
| 2010/0032931 A1 * | 2/2010 | Kumagai et al. | ............. | 280/742 |

* cited by examiner

*Primary Examiner* — Paul N Dickson
*Assistant Examiner* — Joseph Rocca
(74) *Attorney, Agent, or Firm* — Foley & Lardner LLP

(57) ABSTRACT

An occupant side-impact protection apparatus for a motor vehicle comprising an inflatable cushion stored in a folded configuration and an inflator configured to provide gas to inflate the cushion. The cushion is configured to inflate to protect the occupant of a vehicle. The side-impact protection apparatus further includes a tether to provide tension to tailor the deployment trajectory of the cushion. The tether is coupled to the cushion at a first coupling location and a second coupling location and the distance along the tether from the first coupling location to the second coupling location is less than the distance along the cushion from the first coupling location to the second coupling location.

22 Claims, 4 Drawing Sheets

US 8,047,564 B2

AIRBAG

BACKGROUND

The present application relates generally to the field of airbags in automotive vehicles, and more specifically relates to a mechanism for providing tension to a side-impact airbag during deployment to tailor its deployment trajectory as well as its final (i.e., completed deployment) position and deployed geometry to provide improved occupant protection.

SUMMARY

According to an exemplary disclosed embodiment, an occupant side-impact protection apparatus is provided, for protecting at least one occupant of a vehicle. The apparatus includes an inflatable airbag cushion stored in a folded configuration within the seat assembly, an inflator configured to provide gas to inflate the cushion, and at least one tension tether. The airbag cushion may be configured to deploy from the outboard side of the seat assembly between the occupant and the internal portion of the vehicle in a substantially forward direction, with the airbag cushion expanding upward to protect a portion of the occupant, such as the head and/or the thorax, and expanding forward and downward to protect another portion of the occupant, such as the thorax and/or the pelvis.

According to another exemplary embodiment, an occupant side-impact protection apparatus for a motor vehicle includes an inflatable cushion stored in a folded configuration and an inflator configured to provide gas to inflate the cushion. The cushion is configured to inflate to protect a portion of the occupant, such as the head, thorax, and/or pelvis, in a vehicle. The side-impact protection apparatus further includes a tether to provide tension to tailor the deployment trajectory of the cushion. The tether is coupled to the cushion at a first coupling location and a second coupling location and the distance along the tether from the first coupling location to the second coupling location is less than the distance along the cushion from the first coupling location to the second coupling location. The cushion may be configured to deploy from either the outboard or inboard side of the seat assembly, and the cushion may include at least one fold and/or at least one crease between the first and second coupling locations.

According to an exemplary embodiment, an occupant side-impact protection apparatus for a motor vehicle includes an inflatable cushion stored in a folded configuration and an inflator configured to provide gas to inflate the cushion. The cushion is configured to inflate to protect the head and upper torso of the occupant of a vehicle. The side-impact protection apparatus further includes a tether to provide tension to tailor the deployment trajectory of the cushion. The tether is coupled to the cushion at a first coupling location and a second coupling location and the distance along the tether from the first coupling location to the second coupling location is less than the distance along the cushion from the first coupling location to the second coupling location. The tether includes a shortening mechanism located between the first and second coupling locations, where the shortening mechanism includes at least one fold and one stitch, which is configured to tear when the tether is subjected to a predetermined tension. The cushion may be configured to deploy from either the outboard or inboard side of the seat assembly, and the cushion includes at least one fold and/or at least one crease between the first and second coupling locations.

According to an exemplary embodiment, an occupant side-impact protection apparatus for a motor vehicle includes an inflatable cushion stored in a folded configuration and an inflator configured to provide gas to inflate the cushion. The cushion is configured to inflate to protect the head and upper torso of the occupant of a vehicle. The side-impact protection apparatus further includes at least one tether having more than one end to provide tension to tailor the deployment trajectory of the cushion. Each end of the tether is coupled to an external surface of a portion of the cushion and the distance along the tether between any two ends is less than the distance along the cushion between its corresponding coupled portions. The tether includes a shortening mechanism located between any of its two ends, where the shortening mechanism includes at least one fold and one stitch, which is configured to tear when the tether is subjected to a predetermined tension. The cushion includes at least one fold and/or at least one crease between any two coupling locations, which may be located along the perimeter of the cushion, in the interior of the cushion, or where the cushion is mounted.

DETAILED DESCRIPTION

Figure 1:
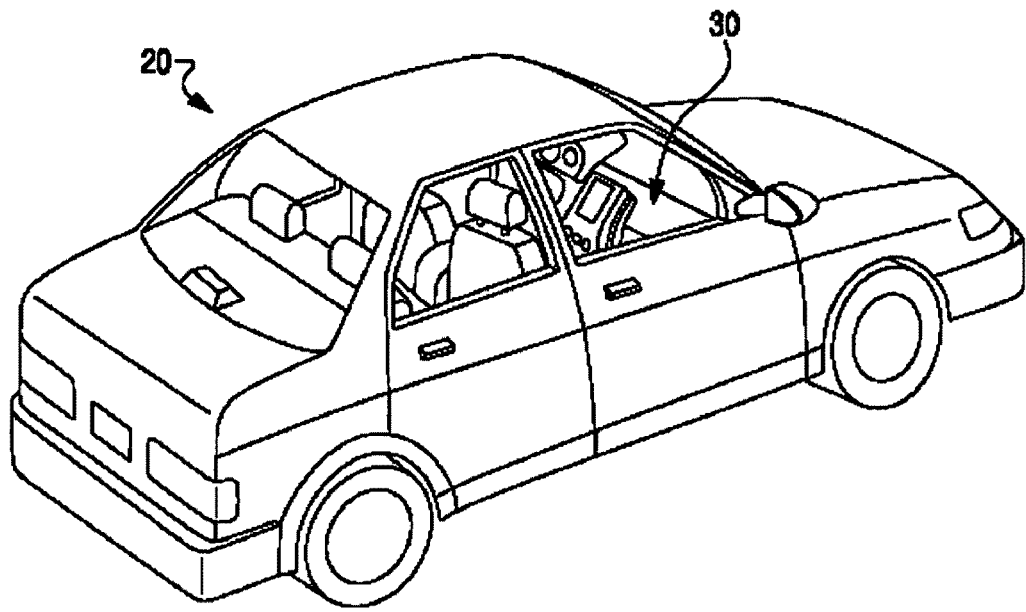
FIG. 1 is a perspective view of an exemplary embodiment of an automotive vehicle that includes a side-impact airbag system having a tension tether.

Side-impact airbag systems are located in vehicles to help protect occupants from injury during a dynamic vehicle event, such as a side-impact or rollover event. A side-impact airbag system may include an inflatable airbag cushion that deploys during a dynamic vehicle event and inflates from gas which is rapidly pushed into the airbag cushion by means of an inflator. An inflator or module may use a device, such as a pyrotechnic device or other airbag inflation device, to generate gas almost instantaneously and to push the gas at a high volumetric flow rate into the inflatable airbag cushion of the airbag system. A side-impact airbag cushion or airbag may be stored within and deployed from a seat assembly of a vehicle, typically either the inside or outside facing surfaces of the seat-back. Side-impact airbags are typically packaged through a process of folding and rolling to compact the airbag in order for it to fit into the small cross-section of the storage area, such as the seat-back of a seat assembly. After installation, the airbag may be stored within the seat-back to provide improved interior vehicle appearance. Side-impact airbags may be used to provide protection to occupants located in any seating row (e.g., first, second, third) of a vehicle and typically provide protection to outboard occupants when deployed. A single side-impact airbag may be configured with multiple inflatable airbag portions or chambers to provide protection to multiple occupants, located in different seating rows and/or positions.

A side-impact airbag system, as disclosed herein, may include a tether or tensioning strap. A tether may be configured to have two or more ends, where each end is coupled to a portion of the airbag assembly, to influence the trajectory of the airbag cushion during deployment and/or to influence the final position (i.e., the position of the airbag when deployment is complete). The tether may influence the deployment trajectory of the airbag cushion by imparting forces into the airbag cushion at the fixing positions between the tether and the airbag assembly. These forces are induced by the tension created in the tether due to expansion of the airbag cushion. The tension in the tether is created by configuring the distance along the tether between the coupling locations, which couple the tether to the airbag cushion, to be shorter relative to the distance along the airbag cushion between the same coupling locations. During deployment, as the airbag cushion expands due to increasing internal airbag chamber pressure from an increasing volume of inflation gas being generated by the inflator, the tension in the tether increases.

A side-impact airbag system may be configured to tailor the deployment trajectory of the airbag cushion to improve safety. For example, conventional side-impact airbags (i.e., without tailored deployment trajectories) may contact other vehicle components, such as a seat armrest, or aesthetic trim components, while expanding during deployment. Contacting another such component during deployment can impede the deployment or alter the trajectory of the airbag and result in the airbag having reduced effectiveness in providing occupant protection. Thus the side-impact airbag system disclosed herein allows for the airbag deployment trajectory to be tailored to the specific vehicle configuration, so that during deployment the airbag cushion will expand in a way to avoid other components that could impede or alter the trajectory of the deploying cushion.

A side-impact airbag system, as disclosed herein, utilizing a tether to tailor deployment also allows for an inexpensive and efficient way to carry-over a common airbag cushion and inflator across varying product lines. For example, a vehicle platform will produce multiple vehicles having varying internal configurations to meet broad customer expectations, which leads to some models having different components that could impede airbag deployment at different locations in the vehicle relative to a baseline vehicle. A side-impact airbag system may include a common airbag cushion and inflator, and by having an alternative configuration of the tether or by adding more than one tether, the deployment trajectory and/or final position of the airbag cushion may be tailored to provide improved occupant protection for each specific model across multiple vehicle platforms, each having varying configurations.

Additionally, a side-impact airbag system may include a tether to tailor deployment, so that the final (i.e., completed deployment) position of the cushion is at a specific position with a specific configuration. For example, a side-impact airbag system may be deployed from the side of a seat-back of a seat assembly and may include a tether to tailor its final position relative to the occupant of the seat. This configuration, an airbag module deployment, when deployed induces a forward and away from the seat or seat occupant (in the cross-car direction) expansion of the airbag cushion due to the forces entering the airbag cushion having a lateral vector component caused by the position of the inflator within the seat-back. A tether may be coupled to the airbag cushion to influence its trajectory, during deployment, by counteracting these lateral inflation forces that induce the airbag to expand away from the seat in the cross-car direction, causing the airbag cushion to expand toward the seat and forward. Occupant protection is improved during a dynamic vehicle event because the tether influences the airbag cushion to deploy toward the seat occupant and thereby reduces the displacement the occupant undergoes during the event. This reduction of displacement reduces the energy of the occupant and thus reduces the reaction forces imparted from the airbag cushion to the occupant from contact between the two.

Referring to FIG. 1, an exemplary embodiment of an automotive vehicle 20 is illustrated, and includes a passenger compartment 30. A passenger compartment includes an airbag system. Those skilled in the art will recognize that the airbag systems disclosed herein can be included within any passenger compartment (e.g., driver side, passenger side, rear passenger) and is not limited by the illustrations herein. An airbag system as disclosed herein may be incorporated to protect any occupant of any vehicle.

Figure 2:
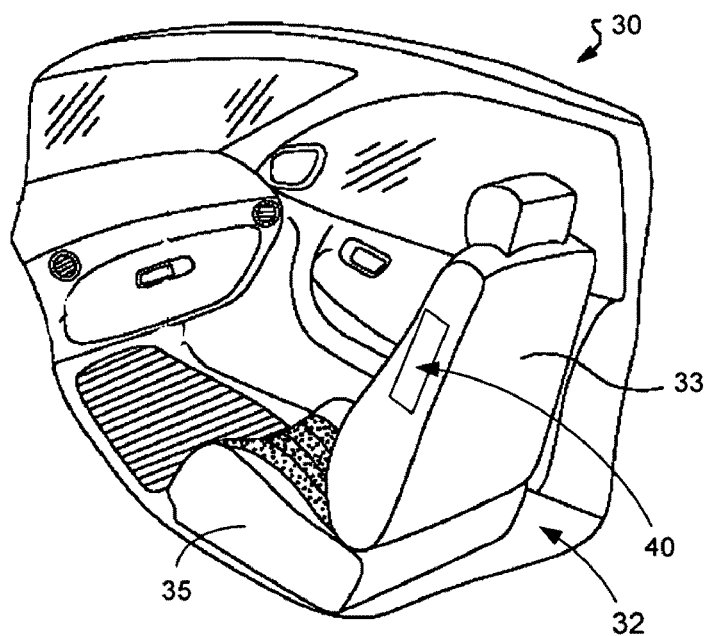
FIG. 2 is a perspective view of a passenger compartment of a vehicle, such as the vehicle of FIG. 1, illustrating an airbag system installed within the seat assembly.

Referring to FIG. 2, an exemplary embodiment of a passenger compartment is illustrated and includes a seat assembly 32, which includes a seat-back 33, a seat cushion 35 and an airbag system 40, which is illustrated in the folded or undeployed state. According to an exemplary embodiment, airbag system 40 may be stored in and deployed from the seat-back 33. According to other embodiments, airbag system 40 may be stored in and deployed from the seat cushion 35, or stored in and deployed from other seat components. A side-impact airbag system as described herein can also be stored in and deployed from other vehicle components outside of the seat assembly, such as the roof rail.

Although airbag system 40 is shown to be stored in seat assembly 32, which is illustrated as a passenger front-row seat assembly, those skilled in the art will recognize that the airbag systems disclosed herein can be included within any seat assembly (e.g., driver seat, passenger seat, rear seat) and is not limited by the illustrations herein. Further, airbag systems as disclosed herein may be stored in and deployed from bucket-style seat assemblies, such as that shown in FIG. 2, or may be stored in and deployed from any other style seat assembly (e.g., bench seats).

Figure 3:
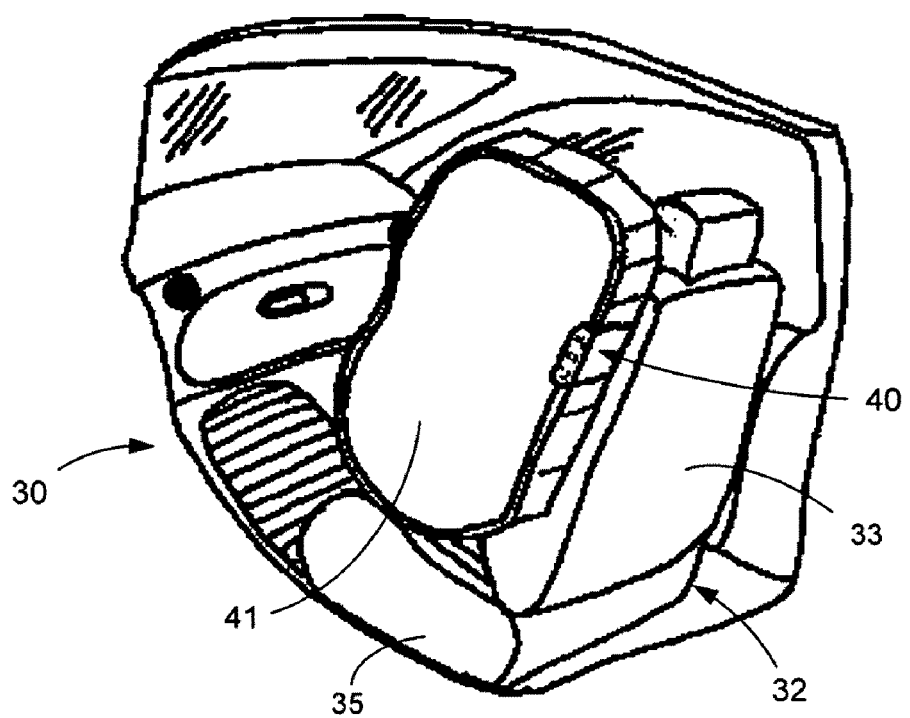
FIG. 3 is a perspective view of a passenger compartment, such as the passenger compartment of FIG. 2, illustrating an exemplary embodiment of an airbag system with the airbag cushion deployed on the inboard side of the seat assembly.
Figure 4:
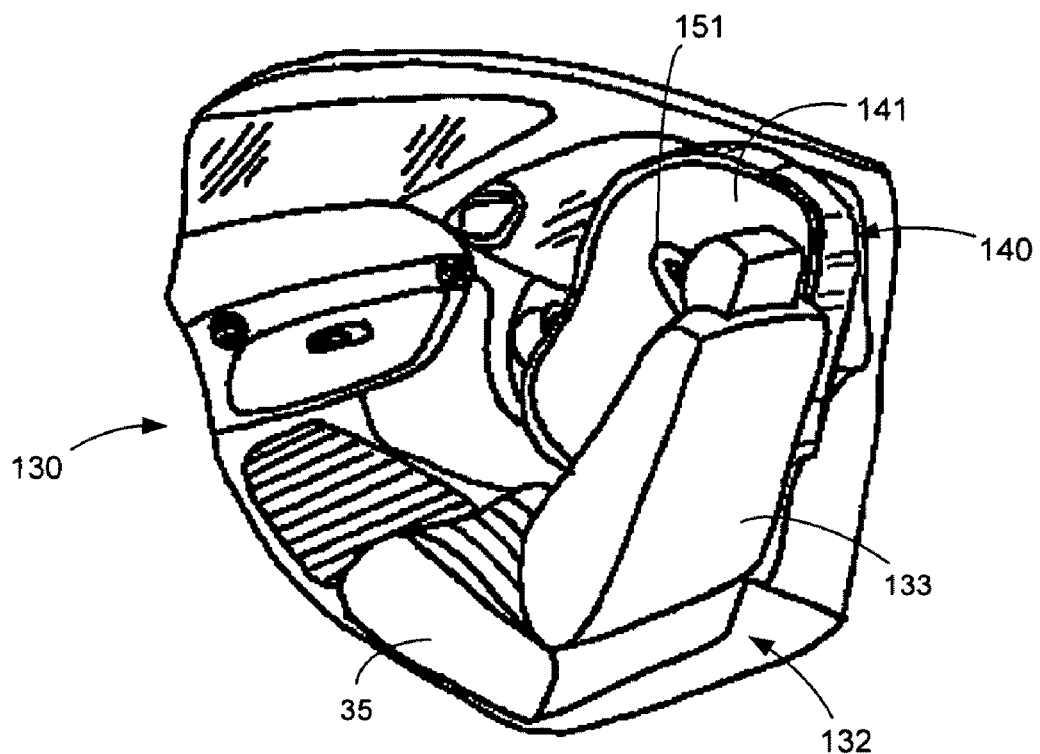
FIG. 4 is a perspective view of a passenger compartment, such as the passenger compartment of FIG. 2, illustrating another exemplary embodiment of an airbag system with the airbag cushion deployed on the outboard side of the seat assembly.

Referring to FIGS. 3 and 4, exemplary embodiments of airbag systems are illustrated in the deployed or unfolded state, where FIG. 3 illustrates the airbag system 40 deployed from the inboard side of passenger seat assembly 32 and FIG. 4 illustrates the airbag system 140 deployed from the outboard side of passenger seat assembly 132. Airbag system 40 includes an inflatable cushion 41, an inflator (not illustrated), and a tension tether (not illustrated). The inflator may be of conventional configuration and may be configured to be housed in a portion of seat assembly 32, such as the seat-back 33, and to provide inflation gas into the inflatable cushion 41 during airbag deployment. The inflatable cushion 41 may be made of one or more than one panel coupled by stitching to expand when inflated during airbag deployment to provide protection to an occupant of a seat assembly. Airbag system 140 includes an inflatable cushion 141, an inflator (not illustrated), and a tension tether 151.

Airbag system 140 may be stored in and deployed from the outboard side of seat assembly 132, as illustrated in FIG. 4. During an event that triggers airbag deployment, such as dynamic vehicle impact, the inflatable cushion 141 deploys or unfolds from inflation gas in a substantially forward direction and expands in thickness in substantially the cross-car or lateral direction. According to an exemplary embodiment, inflatable cushion 141 deploys or unfolds forward along the internal side of the vehicle between seat assembly 132 and a portion of the vehicle, such as the door assembly, to provide side-impact protection to the occupant of seat assembly 132 by preventing impact between the occupant and the internal components of the vehicle. According to an exemplary embodiment, airbag system 140 includes a tension tether 151 coupled to the external surface of the inboard side of inflatable cushion 141. As discussed herein, the tension tether 151 is configured to influence the deployment of the inflatable cushion 141, so that the inflatable cushion 141 may not be impeded during deployment by other vehicle components and/or so that the inflatable cushion 141 may have a completed deployment at a location to improve the protection of the occupant of seat assembly 132.

Airbag system 40 may be stored in and deployed from the inboard side of seat assembly 32, as illustrated in FIG. 3. According to an exemplary embodiment and during deployment of airbag system 40, inflatable cushion 41 deploys or unfolds forward along the internal side of seat assembly 32 between seat assembly 32 and a second seat assembly (not illustrated for clarity) that is substantially adjacent to seat assembly 32 to provide side-impact protection to the occupant of seat assembly 32 by preventing impact between the occupant and the internal components of the vehicle or an occupant of another seat assembly. It should be noted that a seat assembly could include both an outboard deploying side-impact airbag system, such as the airbag system shown in FIG. 4, and an inboard deploying side-impact airbag system, such as the airbag system shown in FIG. 3.

Figure 5:
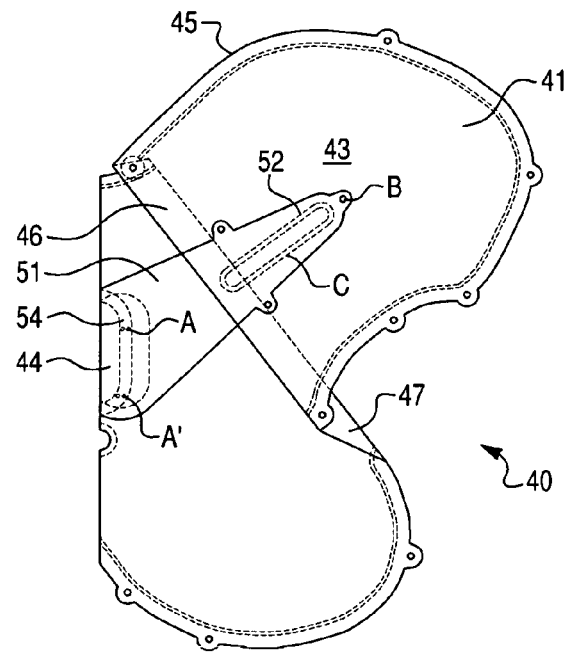
FIG. 5 is a side view of an exemplary embodiment of a side-impact airbag cushion with a single tether for use within an airbag system, shown prior to folding of the airbag.

Referring to FIG. 5, an exemplary embodiment of an airbag system 40 to protect the head and thorax of a seat occupant during a side-impact event of a vehicle is shown and includes an inflatable cushion 41 and a tension tether 51. This configuration of airbag system 40 may be used to deploy from a seat assembly (or other vehicle component), such as from the outboard side of the seat, to provide side-impact protection to the head and thorax regions of the seat occupant, such as reducing injury the head and thorax of the occupant could sustain from an impact with the internal side of the vehicle (e.g., door assembly) caused by a side-impact event of the vehicle. For example, the airbag system shown in FIG. 5 may be used in the vehicle seat configuration shown in FIGS. 3 and 4. Those skilled in the art will recognize that the airbag assemblies disclosed herein are not limited to those that provide protection to the head and thorax regions of the occupant. In fact, an airbag assembly disclosed herein may be configured to provide protection to the head, the thorax, the pelvis, any other body region, or any combination thereof.

Tension tether 51 may be configured substantially as a strap extending between coupling locations and may be made of conventional airbag material, nylon braided strap material, or any useful material that may withstand the tension forces imparted through it and that may allow for coupling to an inflatable cushion. According to the exemplary embodiment shown, tension tether 51 may have a tapered substantially triangular shape having first and second ends 52, 54. According to other embodiments, tension tether 51 may form any shape that can impart a tension force between coupling locations and may be configured to have more than two ends and/or may be configured to have more than two coupling locations.

According to an exemplary embodiment, the first and second ends 52, 54 of tension tether 51 may be coupled to inflatable cushion 41 at two coupling locations A, B using a coupling method, such as stitching or any other useful form of coupling. According to other embodiments, a tension tether may be coupled to an inflatable cushion using more than two coupling locations, for example, when the tension tether has more than two ends. Coupling locations A, B may comprise of substantially round stitching that couples, local to the stitching, the tension tether 51 to the inflatable cushion 41. It should also be noted that the coupling location may take the form of any useful shape, such as elliptical, and may couple any portion of the tension tether, such as a middle portion, as shown by coupling location C. It should also be noted that according to an exemplary embodiment, the coupling method is configured to be strong enough to withstand the tension forces that the tension tether is subjected to during airbag deployment, but according to another embodiment, the coupling method may be configured to allow for decoupling of the tension tether to the inflatable cushion at a predetermined force, as discussed in greater detail below.

A tension tether 51 may be coupled to different portions of the inflatable cushion 41. For example, tension tether 51 may be coupled to the mounting portion 44 and the interior portion 43 of inflatable cushion 41, as shown in FIG. 5. Tension tether 51 may also be coupled to a perimeter portion 45 or any other portion of inflatable cushion 41. Additionally, a tension tether may have more than one coupling location at any one end of the tether. For example, the second end 54 of tension tether 51 may be coupled to the inflatable cushion 41 using the two coupling locations A and A'. The deployment trajectory of the inflatable cushion 41 of airbag system 40 may be tailored by the number of coupling locations as well as by the location (i.e., portion) on the cushion of each coupling location.

Also referring to FIG. 5, according to an exemplary embodiment, airbag system 40 is configured so that the distance along the tension tether 51 from its first coupling location, tether coupling location A, to its second coupling location, tether coupling location B, is less than the distance along the inflatable cushion from its first coupling location, cushion coupling location A, to its second coupling location, cushion coupling location B. Thus, inflatable cushion 41 may include a lengthening mechanism 46 to provide a distance along the cushion 41 from coupling location A to coupling location B that is greater than the distance along the tension tether 51 from coupling location A to coupling location B. According to an exemplary embodiment, lengthening mechanism 46 may include a fold, such as a Z-fold, which allows for three layers of inflatable cushion 41 to form an overlap 47 over a common distance. According to other embodiments, lengthening mechanism 46 may include a crease, a pleat or a series of any of the aforementioned configurations. The configuration of lengthening mechanism 46 influences the distance of overlap 47. For example, an inflatable cushion configured to have a Z-fold lengthening mechanism 46 should have an overlap 47 (relative to distance along) equal to two times the distance of the overlapping portions, since there are three layers of overlapping cushion.

The configuration of the lengthening mechanism 46 and the distance of overlap 47 may be varied to affect how the tension tether influences the trajectory of the inflatable cushion 41 during deployment. A greater distance of overlap 47 corresponds to a greater difference between the distance of the inflatable cushion 41 from coupling location A to coupling location B and the distance of the tension tether 51 from coupling location A to coupling location B. This difference affects when during deployment, tension is imparted into tension tether 51, as a smaller difference delays the imparting of tension into tether 51, while a greater difference causes tension to be imparted in tension tether 51 sooner. This difference may also change the magnitude of the force or tension in tether 51, which may influence the deployment trajectory of inflatable cushion 41.

Figure 6:
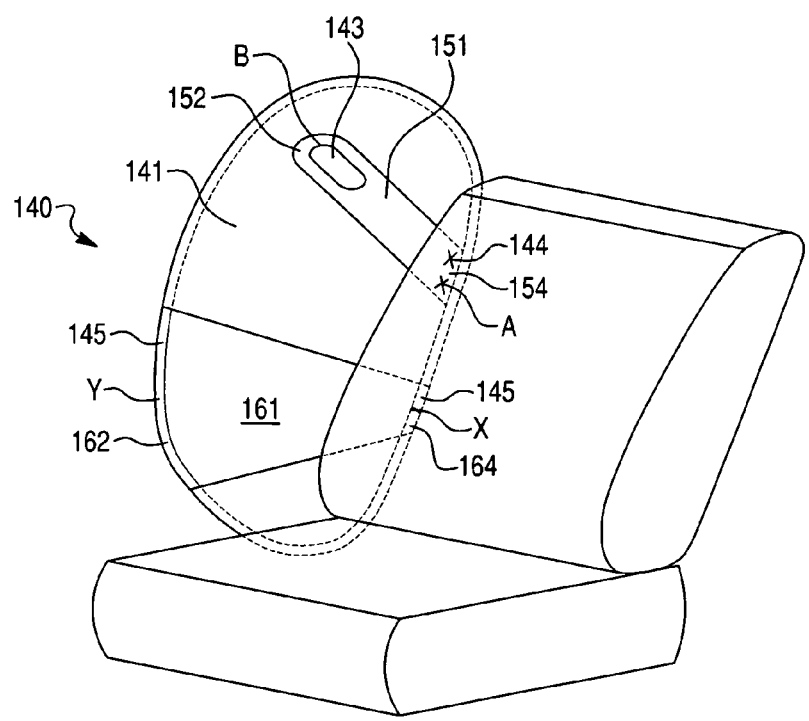
FIG. 6 is a perspective view of an exemplary embodiment of an airbag system, shown in the deployed or unfolded state, having multiple external inboard tethers.

Referring to FIG. 6, airbag assembly 140 is illustrated according to an exemplary embodiment and includes an inflatable cushion 141 shown in the deployed or unfolded state. Airbag assembly 140 further includes a tension tether 151 having first and second ends 152, 154 coupled at coupling locations A and B to the external side of the inboard surface of inflatable cushion 141. The first end 152 of tension tether 151 is coupled to an interior (i.e., the cushion surface within the perimeter) portion 143 of inflatable cushion 141, and the second end 154 of tension tether 151 is coupled to the mounting portion 144 of inflatable cushion 141. During deployment, the tension tether 151, by having a distance along tether 151 between coupling locations A and B that is shorter than the distance along inflatable cushion 141 between coupling locations A and B, is put into tension from forces caused by the expanding inflatable cushion 141.

Airbag assembly 140 may further include a second tension tether 161 having first and second ends 162, 164 coupled at coupling locations X and Y to the external side of the inboard surface of inflatable cushion 141. The first end 162 of tension tether 161 is coupled to a section of the perimeter portion 145 of inflatable cushion 141, and the second end 164 of tension tether 161 is coupled to another section of the perimeter portion 145 of inflatable cushion 141. During deployment, the tension tether 161, by having a distance along tether 161 between coupling locations X and Y that is shorter than the distance along inflatable cushion 141 between coupling locations X and Y, is put into tension from forces caused by the expanding inflatable cushion 141.

Tension tethers 151 and 161 are configured to influence the deployment trajectory of inflatable cushion 141 by pulling the interior portion of the cushion in toward the occupant, so that the higher the magnitude of the tension in the tether the greater the deployment trajectory is influenced. Tension in tethers 151 and 161 may also tailor deployment of the inflatable cushion 141 so that the cushion completes deployment at a position closer to the initial position (i.e., position at the initiation of the event that triggered airbag deployment) of the occupant. This decreases the forces and energy imparted into the occupant from contact with the airbag cushion by reducing the deflection of the occupant required to contact the airbag cushion.

Figure 7:
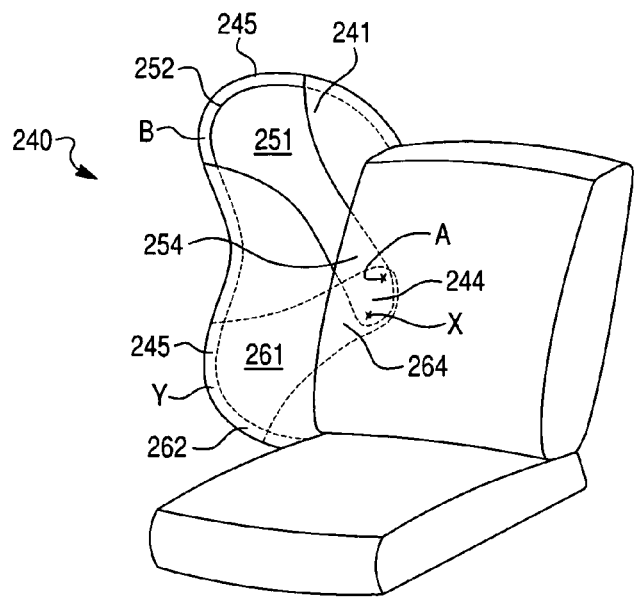
FIG. 7 is a perspective view of another exemplary embodiment of an airbag system, shown in the deployed or unfolded state, having multiple external inboard tethers.

Referring to FIG. 7, an exemplary embodiment of an airbag assembly 240 is illustrated and includes an inflatable cushion 241 shown in the deployed or unfolded state and a tension tether 251. Tension tether 251 includes first and second ends 252, 254 coupled at coupling locations A and B to the external side of the inboard surface of inflatable cushion 241. The first end 252 of tension tether 251 is coupled to a perimeter portion 245 of inflatable cushion 241, and the second end 254 of tension tether 251 is coupled to the mounting portion 244 of inflatable cushion 241. During deployment, the tension tether 251, by having a distance along tether 251 between coupling locations A and B that is shorter than the distance along inflatable cushion 241 between coupling locations A and B, is put into tension from forces caused by the expanding inflatable cushion 41.

Airbag assembly 240 may further include a second tension tether 261 having first and second ends 262, 264 coupled at coupling locations X and Y to the external side of the outboard surface of inflatable cushion 241. The first end 262 of tension tether 261 is coupled to a section of the perimeter portion 245 of inflatable cushion 241, and the second end 264 of tension tether 261 is coupled to the mounting portion 244 of inflatable cushion 241. During deployment, the tension tether 261, by having a distance along tether 261 between coupling locations X and Y that is shorter than the distance along inflatable cushion 241 between coupling locations X and Y, is put into tension from forces caused by the expanding inflatable cushion 241.

Tether 251 influences the deployment trajectory of inflatable cushion 241 by pulling the upper portion of the leading edge of deployment (i.e., the front of the airbag) in toward the occupant, so that the higher the magnitude of the tension in the tether the greater the deployment trajectory is influenced. Tether 261 influences the deployment trajectory of inflatable cushion 241 by pulling the lower portion of the leading edge of deployment away from the occupant, so that the higher the magnitude of the tension in the tether the greater the deployment trajectory is influenced. Tether 251 may also tailor deployment of the inflatable cushion 241 so that the cushion completes deployment at a position closer to the initial position of the occupant to decrease the forces and energy imparted into the occupant from contact with the airbag cushion by reducing the deflection the occupant must undergo in order to contact the airbag cushion. Air bag system 240 configured with tether 251 having substantially the same lengthening mechanism and overlap relative to tether 151 of airbag system 140 (shown in FIG. 6), would have a greater influence on the deployment trajectory.

Figure 8:
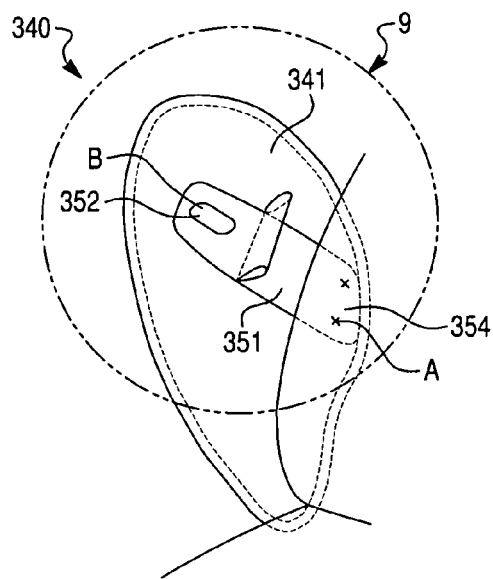
FIG. 8 is a perspective view of yet another exemplary embodiment of an airbag system, shown in the deployed or unfolded state, having an external inboard tether configured to include a shortening mechanism.
Figure 9:
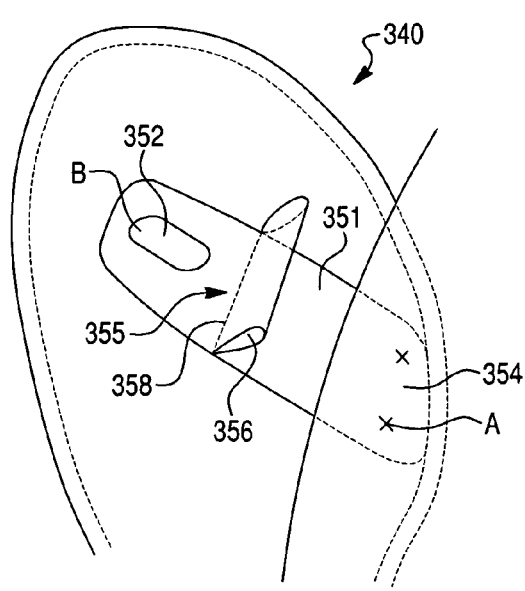
FIG. 9 is a detail view of the airbag system of FIG. 8, illustrating the configuration of the shortening mechanism of the included external inboard tether.

Referring to FIGS. 8 and 9, an exemplary embodiment of an airbag system 340 is illustrated and includes an inflatable cushion 341 shown in the deployed or unfolded state and a tension tether 351 having two ends 352, 354 coupled at coupling locations A and B to the external side of the inboard surface of inflatable cushion 341. Tension tether 351 further includes shortening mechanism 355 to create a duel-stage influence to the deployment trajectory. According to an exemplary embodiment, shortening mechanism 355 includes a fold or loop 356, which may be configured by folding a portion of tension tether 351 back onto itself, and a tear stitch 358, which may be configured to retain the fold 356 until a predetermined tension within tether 351 is reached, whereby the tear stitch 358 is configured to tear. Upon tearing of the tear stitch 358, the tether 351 is no longer in tension and thus allows the inflatable cushion 341 to expand without having its deployment trajectory influenced until the tether 351 again is brought taught. Following tearing of the tear stitch 358, the inflatable cushion 341 expands so that coupling locations A and B become farther apart (i.e., have an increasing distance between them), which in turn causes the first end 352 and second end 354 of tether 351 to become farther apart. Inflatable cushion, by having a greater distance along the cushion between coupling locations A and B, relative to the distance along tether 351 between coupling locations A and B, allows for the tether 351 to become taught during continued airbag deployment, whereby the tether 351 then imparts a force to influence deployment trajectory of the inflatable cushion 341.

Shortening mechanism 355 allows for airbag system 340 to have a duel-stage influenced deployment trajectory of inflatable cushion 341. The first stage begins when tether 351 is put into tension and ends when tear stitch 358 releases the tension in tether 351. The second state begins when tether 351 is again put into tension following additional airbag expansion subsequent to tear stitch 358 releasing tension in tether 351 and ends when airbag deployment is complete.

Those skilled in the art will recognize that the airbag system is not limited to have one tether to provide for tailored deployment trajectory of the inflatable cushion. In fact, an airbag system may include multiple tethers coupled at different locations to the inflatable cushion, where each location of the inflatable cushion have different lengthening mechanisms having varying distances of overlap. It should also be noted that an airbag system could be configured to have more than two stages by including one tension tether having more than one shortening mechanism or by including more than one tension tether having differently configured shortening mechanisms. Additionally, an airbag system may include more than one tension tether, where at least one tether is included on the inboard side of the inflatable cushion and where at least one tether is included on the outboard side of the inflatable cushion.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag systems as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An occupant side-impact protection apparatus for a motor vehicle, the apparatus comprising:
    an inflatable cushion stored in a folded configuration and deploys from a seat assembly within the motor vehicle;
    an inflator configured to provide gas to inflate the cushion; wherein the cushion is configured to inflate to protect an occupant of the vehicle; and
    a tether to provide tension to tailor a deployment trajectory of the cushion;
    wherein the tether is coupled to the cushion at a first coupling location and a second coupling location, the tether being disposed externally relative to the cushion;
    wherein a distance along the tether from the first coupling location to the second coupling location is less than a distance along the cushion from the first coupling location to the second coupling location; and wherein, upon deployment, one of the first and second coupling locations is located nearer to a seat back of the seat assembly than the other of the first and second coupling locations and the other of the first and second coupling locations is located at a forward location relative to the one of the first and second coupling locations in a vehicle longitudinal direction.

2. The protection apparatus of claim 1, wherein the cushion is configured to deploy from an outboard side of the seat assembly within the vehicle.

3. The protection apparatus of claim 1, wherein the cushion is configured to deploy from an inboard side of the seat assembly within the vehicle.

4. The protection apparatus of claim 1, wherein the tether is configured to couple to an external surface of the cushion.

5. The protection apparatus of claim 1, wherein the cushion includes at least one fold between the first coupling location and the second coupling location.

6. The protection apparatus of claim 1, wherein the cushion includes at least one crease between the first coupling location and the second coupling location.

7. The protection apparatus of claim 1, wherein the cushion includes at least one fold and at least one crease between the first coupling location and the second coupling location.

8. The protection apparatus of claim 1, wherein the first coupling location of the tether is located on a perimeter of the cushion and the second coupling location of the tether is located on a portion of the cushion away from the perimeter.

9. The protection apparatus of claim 1, wherein the second coupling location of the tether is located on a portion of the cushion away from a perimeter of the cushion.

10. The protection apparatus of claim 1, wherein the tether is disposed externally relative to a fillable volume of the cushion.

11. An occupant side-impact protection apparatus for a motor vehicle, the apparatus comprising:
    an inflatable cushion stored in a folded configuration and deploys from a seat assembly within the motor vehicle;
    an inflator configured to provide gas to inflate the cushion; wherein the cushion is configured to inflate to protect an occupant of the vehicle; and a tether to provide tension to tailor a deployment trajectory of the cushion,
wherein the tether is coupled to the cushion at a first coupling location and a second coupling location, the tether being disposed externally relative to the cushion;
wherein a distance along the tether from the first coupling location to the second coupling location is less than a distance along the cushion from the first coupling location to the second coupling location;
wherein both the first coupling location and the second coupling locations are located on a perimeter of the cushion; and wherein, upon deployment, one of the first and second coupling locations is located nearer to a seat back of the seat assembly than the other of the first and second coupling locations and the other of the first and second coupling locations is located at a substantially forward location relative to the one of the first and second coupling locations in a vehicle longitudinal direction.

12. The protection apparatus of claim 11, wherein the cushion is configured to deploy from an outboard side of the seat assembly within the vehicle.

13. The protection apparatus of claim 11, wherein the cushion is configured to deploy from an inboard side of the seat assembly within the vehicle.

14. The protection apparatus of claim 11, wherein the tether further includes a shortening mechanism located between the first and second coupling locations and the shortening mechanism includes at least one fold and at least one stitch.

15. The protection apparatus of claim 14, wherein the stitch is configured to tear when the tether is subjected to a predetermined tension.

16. The protection apparatus of claim 11, wherein the tether is configured to couple to an external surface of the cushion.

17. The protection apparatus of claim 11, wherein the cushion includes at least one fold between the first coupling location and the second coupling location.

18. The protection apparatus of claim 11, wherein the cushion includes at least one crease between the first coupling location and the second coupling location.

19. The protection apparatus of claim 11, wherein the cushion includes at least one fold and at least one crease between the first coupling location and the second coupling location.

20. The protection apparatus of claim 11, wherein the tether is disposed externally relative to a fillable volume of the cushion.

21. An occupant side-impact protection apparatus for a motor vehicle, the apparatus comprising:
an inflatable cushion stored in a folded configuration;
an inflator configured to provide gas to inflate the cushion, wherein the cushion is configured to inflate to protect an occupant of the vehicle;
a first tether to provide tension to tailor a deployment trajectory of the cushion, wherein the first tether is coupled to the cushion at a first coupling location and a second coupling location, wherein a distance along the first tether from its first coupling location to its second coupling location is less than a distance along the cushion from the first tether's first coupling location to the first tether's second coupling location, wherein the first tether's first coupling location is located on a perimeter of the cushion and the first tether's second coupling location is located on a portion of the cushion away from the perimeter; and
a second tether coupled to the cushion at a first coupling location and a second coupling location;
wherein a distance along the second tether from its first coupling location to its second coupling location is less than a distance along the cushion from the second tether's first coupling location to the second tether's second coupling location; and
wherein both the second tether's first coupling location and the second tether's second coupling location are located on the perimeter of the cushion.

22. An occupant side-impact protection apparatus for a motor vehicle, the apparatus comprising:
an inflatable cushion stored in a folded configuration;
an inflator configured to provide gas to inflate the cushion, wherein the cushion is configured to inflate to protect an occupant of the vehicle;
a first tether to provide tension to tailor a deployment trajectory of the cushion, wherein the first tether is coupled to the cushion at a first coupling location and a second coupling location, wherein a distance along the first tether from its first coupling location to its second coupling location is less than a distance along the cushion from the first tether's first coupling location to the first tether's second coupling location, wherein both the first tether's first coupling location and the first tether's second coupling locations are located on a perimeter of the cushion; and
a second tether coupled to the cushion at a first coupling location and a second coupling location;
wherein a distance along the second tether from its first coupling location to its second coupling location is less than a distance along the cushion from the second tether's first coupling location to the second tether's second coupling location; and
wherein the first coupling location of the second tether is located on the perimeter of the cushion and the second coupling location of the second tether is located on a portion of the cushion away from the perimeter.

* * * * *